United States Patent [19]

Greiner et al.

[11] Patent Number: 4,779,838

[45] Date of Patent: Oct. 25, 1988

[54] ELECTROMAGNETICALLY ACTUATABLE FUEL INJECTION VALVE

[75] Inventors: Max Greiner, Gerlingen; Udo Hafner, Lorch; Waldemar Hans, Bamberg; Heinrich Knapp, Leonberg; Wolfgang Kramer, Kemmern; Rudolf Krauss, Stuttgart; Ferdinand Reiter, Markgroningen; Peter Romann, Stuttgart; Rudolf Sauer, Benningen, all of Fed. Rep. of Germany

[73] Assignee: Robert Bosch GmbH, Stuttgart, Fed. Rep. of Germany

[21] Appl. No.: 114,977

[22] Filed: Oct. 30, 1987

[30] Foreign Application Priority Data

Dec. 4, 1986 [DE] Fed. Rep. of Germany ....... 3641470

[51] Int. Cl.[4] .......................... F16K 31/08; B05B 1/30

[52] U.S. Cl. ................................ 251/65; 251/129.15; 239/585

[58] Field of Search .............................. 239/584, 585; 251/129.15, 65

[56] References Cited

U.S. PATENT DOCUMENTS 4,274,598 6/1981 Wilfert et al. ....................... 239/585
4,454,990 6/1984 Lewis ................................ 239/585
4,653,720 3/1987 Knapp et al. .

*Primary Examiner*—Arnold Rosenthal
*Attorney, Agent, or Firm*—Edwin E. Greigg

[57] ABSTRACT

An electromagnetically actuatable fuel injection valve which serves to supply fuel to a mixture-compressing internal combustion engine having externally supplied ignition. The fuel injection valve includes a valve housing with a mouth piece, in which a valve seat body is disposed, included are two magnet coils, two cores and one armature of soft magnetic material, which with an extension is inserted into a receiving bore of a spherical guide section made from hard material and is connected to a valve needle. The spherical guide section is slidably supported with its circumference in a guide bore of the valve seat body and in its stroke movement away from the core is limited by a stop opening adjoining the guide bore.

3 Claims, 1 Drawing Sheet

ELECTROMAGNETICALLY ACTUATABLE FUEL INJECTION VALVE

BACKGROUND OF THE INVENTION

The invention is based on an electromagnetically actuatable fuel injection valve as defined hereinafter. A fuel injection valve is already known in which the armature has a spherical guide section so that when the valve is opened it comes to rest with one contact face on a stop opening. This has the disadvantage that the optimal material for the armature cannot be used, since on the one hand the material should have good soft magnetic properties, and on the other hand it should be hard in order to reduce wear.

OBJECT AND SUMMARY OF THE INVENTION

The electromagnetically actuatable fuel injection valve has the advantage over the prior art that the magnetic properties and the service life of the fuel injection valve are improved. Embodying the armature of soft magnetic material leads to a faster electromagnet circuit, while embodying the spherical guide section of hard material reduces wear and thus leads to a longer service life of the fuel injection valve.

Further improvements to the fuel injection valve as revealed herein are also attainable. As will be noted as the description progresses, the required stroke of the valve needle can be adjusted simply and accurately.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
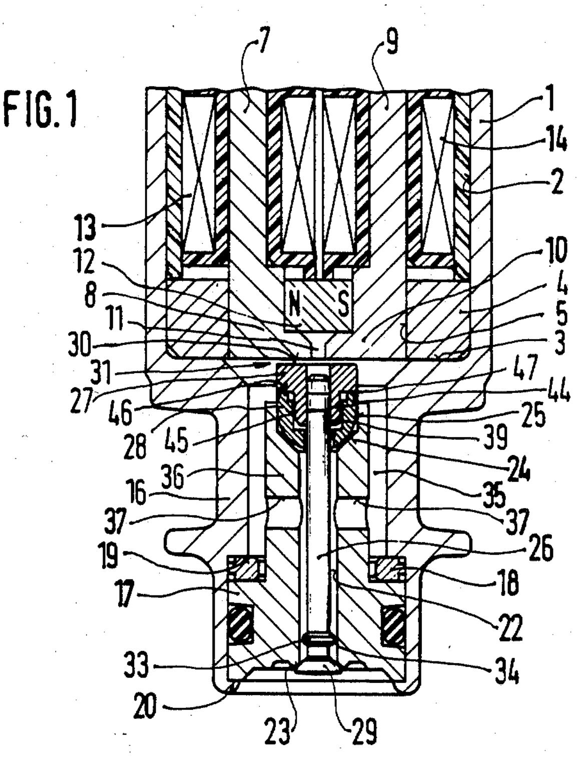
FIG. 1 shows a first exemplary embodiment of a fuel injection valve embodied in accordance with the invention.

The fuel injection valve shown in FIG. 1, for a fuel injection system of a mixture-compressing internal combustion engine having externally supplied ignition, has a valve housing 1, the stepped inner housing bore 2 of which has a first shoulder 3, on which a base plate 4 rests. Protruding into the central recess 5 of the base plate 4 are a first pole piece 7 having a first bent pole 8 and a second pole piece 9 having a second bent pole 10. Between themselves, the poles 8 and 10, oriented toward one another, form a pole air gap 11, which is spanned in part by a permanent magnet 12. Inside the inner housing bore 2, a first magnet coil 13 is disposed on the first pole piece 7 and a second magnet coil 14 is disposed on the second pole piece 9, the coils being located above the poles 8, 10.

Adjacent to the region receiving the magnet coils, the valve housing 1 has a mouth piece 16 of smaller diameter with which the inner housing bore 2 is coextensive and which receives a valve seat body 17, which rests via a shim 18 on a second shoulder 19 of the inner housing bore 2. The rim of the mouth piece 16, in a flanged over portion 20, partly surrounds the valve seat body 17 and presses it toward the second shoulder 19 against the shim 18. In the axial direction, the valve seat body 17 has a through flow bore 22, which discharges outward into a fixed valve seat 23 embodied on the valve seat body 17. Remote from the valve seat 23, the flow bore 22 merges with an oblique stop opening 24, the diameter of which increases in conical fashion from the flow bore 22 up to an adjoining cylindrical guide bore 25. A valve needle 26 passes with play through the flow bore 22, and an armature 27 of ferromagnetic material is fixed on one end of the valve needle 26, the armature 27 being attached to the valve needle 26 by a spherically embodied guide section 28 that is slidably supported in the guide bore 25 with little radial play. Remote from the armature 27, a closing head 29 is embodied on the valve needle 26, and arranged to cooperate with the valve seat 23. The armature has a flattened portion 30 oriented toward the pole pieces 7, 9 acting as a core, and when the magnet coils 13, 14 are not excited, the armature 27 is attracted toward the poles 8, 10 by the permanent magnetic field of the permanent magnet 12, but an air gap 31 remains between the armature and the poles when the closing head 29 is resting on the valve seat 23. It is to be understood that in this position, the spherical guide section 28 has lifted away from the stop opening 24. The radial guidance of the spherical guide section 28 and hence of the armature 27 is effected on the circumference of the guide section, by virtually line contact in the guide bore 25. Directly upstream of the closing head 29, a metering collar 33 is embodied on the valve needle 25, acting with the wall of the flow bore 22 as a throttle restriction for the fuel and forming an annular metering gap 34, at which for example approximately 70% of the fuel pressure, relative to the ambient pressure prevailing downstream of the valve seat 23, drops. The remaining 30% of the fuel pressure relative to the ambient pressure drops at the flow cross section between the valve seat 23 and the closing head 29. Disposing the annular metering gap 34 directly upstream of the valve seat 23 has the advantage that the fuel meterng takes place at a location at which the annular metering gap does not become plugged with components of the intake tube atmosphere, such as superfine dust and particles from recirculated exhaust gas, which would cause the metered fuel quantity to vary during operation. The delivery of fuel to the flow bore 22 is effected in an annular conduit 35 between the perforated tubular portion 36 of the valve seat body 17 and the inner housing bore 2, which leads to a fuel delivery connection, not shown, or a fuel feed pump, on the one hand, and on the other hand, the radial bores 37 which lead from it to the flow bore 22.

As already explained, when the magnet coils 13, 14 are not excited, the armature 27 is attracted by the permanent magnetic field 12 toward the poles 8, 10, thus retaining the closing head 29 on the valve seat 23. Upon excitation of the magnet coils 13, 14, the permanent magnetic flux at the armature 27 is countered by an approximately equal eletromagnetic flux, so that the pressure of the fuel engaging the valve needle in the opening direction of the valve is sufficient to lift the closing head 29 from the valve seat 23, and the armature 27 can execute a stroke movement until the guide section 28 comes to rest on the wall of the stop opening 24. The stroke movement of the armature 27 or of the closing head 29 relative to the valve seat 23 can be adjusted in a known manner prior to the mounting of the armature 27 or guide section 28 on the valve needle 26.

When the closing head 29 has lifted outward away from the valve seat 23, the fuel flowing to the valve seat 23 at the same time centers the valve needle 25 in the flow bore 22.

The armature 27 and the spherical guide section 28 are embodied as independent elements. The cylindrical armature 27 is made of highly soft magnetic material and has an extension 44 of lesser diameter, with which it protrudes into a receiving bore 45 of the guide section 28, which is made of a hard material. A central bore 39 for receiving the valve needle 26 penetrates both the armature 27 and the guide section 28. The armature 27 is seated on the end face 46 of the guide section 28 adjacent to the valve needle, and on this end face 46 it is firmly joined to the guide section 28 at 47, for example by laser welding.

Figure 2:
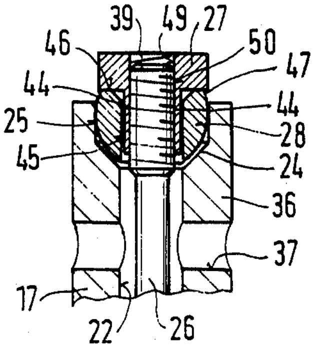
FIG. 2 shows a second exemplary embodiment of according to the invention of an armature having a spherical guide section, seen in a side elevational view.

In the second exemplary embodiment shown in FIG. 2, in which once again the same reference numerals have been used for elements having the same function, the armature 27 and guide section 28 are again embodied as independent elements, the armature 27 being made of soft magnetic material and the guide section 28 of a hard material. The extension 44 of the armature 27 is inserted into the receiving bore 45 that penetrates the guide section 28, and the armature 27 and guide section 28 are welded together at 47. The central bore 39 penetrating the armature 27 is provided with an internal thread 49, into which the valve needle 26 is screwed with an external thread 50 and fixed therein once the final position has been set, for example by welding.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable fuel injection valve having a valve housing, a valve seat body disposed in the valve housing, at least one magnet coil, a core and an armature interposed between said housing and said valve seat body, the armature connected to a spherical guide section which carries a valve needle, the circumference of said spherical guide section is slidably supported in a guide bore of the valve seat body and the stroke movement of said spherical guide section in the direction away from the core can be limited by means of a stop opening which adjoins the guide bore, further in which the armature (27) and the spherical guide section (28) are embodied as independent elements, said armature (27), being made from soft magnetic material, and arranged to protrude with an extension (44) into a receiving bore (45) of the guide section (28), said guide section being made of hard material and firmly joined to the said armature.

2. A fuel injection valve as defined by claim 1, in which the armature (27) has a central bore (39), into which one end of the valve needle (26) is secured.

3. A fuel injection valve as defined by claim 2, in which the central bore (39) of the armature (27) has an internal thread (49), and the valve needle (26) is provided with an external thread which is screwed into the central bore (39).

* * * * *